Figure 1:
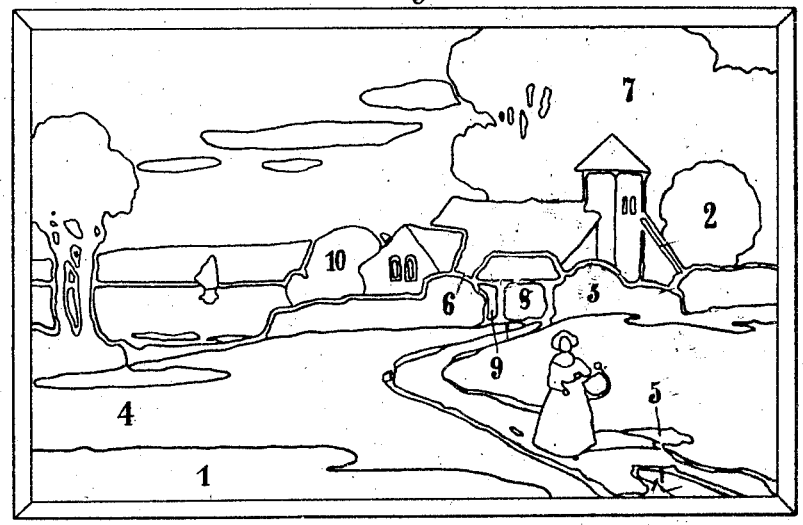

H. A. J. SCHULTZ.
GAME.
APPLICATION FILED DEC. 11, 1912.

1,063,472.

Patented June 3, 1913.

WITNESSES

INVENTOR
H.A.J. SCHULTZ
BY
ATTORNEY

UNITED STATES PATENT OFFICE.

HEINRICH ANTON JOHANNES SCHULTZ, OF HAMBURG, GERMANY.

GAME.

1,063,472. Specification of Letters Patent. Patented June 3, 1913.

Application filed December 11, 1912. Serial No. 736,134.

*To all whom it may concern:*

Be it known that I, HEINRICH ANTON JOHANNES SCHULTZ, a subject of the German Emperor, and resident of Hamburg, Germany, have invented a certain new and useful Improvement in Games, of which the following is a specification.

The present invention relates to a game or puzzle played by forming colored pictures in accordance with a given pattern from parts cut from a sheet of paper, a card or the like.

In accordance with the invention there is illustrated on a white or unicolored sheet of paper, card or the like any desired scene or the figures of men or animals with its parts outlined. A second colored illustration of the picture is also provided as a pattern, the drawing and coloring being without detail after the manner of modern posters and advertisements, the effect being obtained by unicolored patches and sharp color contrasts. On a third sheet, all of the parts of the figures are printed in the same color with their outlines lying as close together as possible and on the back of the third sheet the proper color of each part is painted as an uninterrupted colored space so that the whole surface on this side shows nothing but a number of different colored spaces meeting one another.

Each figure is cut out with scissors around the outline, the corresponding part on the colored pattern sought and the cut out figure pasted on the desired part of the unicolored sheet, showing the view in outline. As the outlines are not shown on the colored side of the sheet to be cut, but are shown on its rear side, it is immaterial whether the scissors cut exactly to the line, i. e. whether the figures are cut by inexperienced people or not. This would be noticeable if the outlines were printed on the colored side.

The drawing illustrates one embodiment of the invention.

Figure 2:
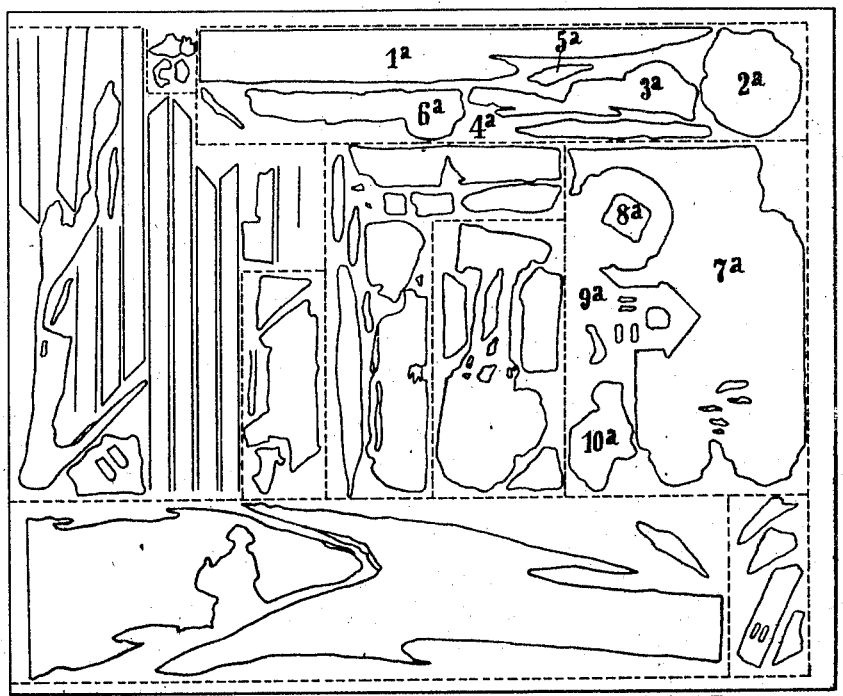

Figure 1 is intended to show the unicolored surface to which the colored portions cut out are to be applied. Fig. 2 shows the rear side of the sheet to be cut out.

The lawn, inclosures, shrubs and spaces denoted in Fig. 1 by the numerals 1 to 10 are denoted on the sheet shown in Fig. 2 by the corresponding numerals $1_a$ to $10_a$. These are arranged very close together, the dotted lines being intended to indicate that the space on the other side of the sheet is of this form and is of one and the same color, green, yellow etc., the numerals 7 to 10 and $7_a$ to $10_a$ are intended to denote parts of neutral tints serving as contrasts, which also lie in one and the same dotted space, the said space being provided on the other side only with the color in question. The side of the sheet shown in Fig. 2 is preferably coated with adhesive so that the figures cut out can, after being moistened, be applied to the sheet shown in Fig. 1. The last mentioned sheet is preferably throughout of the most prevalent simple color.

Having described my invention, what I claim and desire to secure by Letters Patent of the United States is:—

A sheet serving for the production of colored pictures provided on one side with differently colored spaces and with outlined objects represented on the other side.

In testimony whereof I have signed my name to this specification in the presence of two subscribing witnesses.

HEINRICH ANTON JOHANNES SCHULTZ.

Witnesses:
 GUSTAV WEBER,
 ERNEST H. L. MUMMENHOFF.